United States Patent [19]

Heck

[11] 4,447,740
[45] May 8, 1984

[54] WAVE RESPONSIVE GENERATOR

[76] Inventor: Louis J. Heck, 5229 Choctaw Dr., Baton Rouge, La. 70805

[21] Appl. No.: 310,492

[22] Filed: Oct. 13, 1981

Related U.S. Application Data

[63] Continuation of Ser. No. 92,379, Nov. 8, 1979, abandoned.

[51] Int. Cl.³ .............................................. F03B 13/12
[52] U.S. Cl. ....................................... 290/53; 60/501; 60/502; 417/330
[58] Field of Search ...................... 290/42, 53; 60/501, 60/502; 417/330

[56] References Cited

U.S. PATENT DOCUMENTS

| | | | |
|---|---|---|---|
| 889,153 | 5/1908 | Roehr | 416/83 |
| 4,206,601 | 6/1980 | Eberle | 60/497 |

FOREIGN PATENT DOCUMENTS

| | | | |
|---|---|---|---|
| 52-8244 | 1/1977 | Japan | 290/53 |
| 18837 | 2/1956 | United Kingdom | |

Primary Examiner—B. Dobeck
Assistant Examiner—Shelley Wade
Attorney, Agent, or Firm—Charles C. Garvey, Jr.

[57] ABSTRACT

A wave responsive generator comprises a buoyant float having an outer fixed shaft downwardly depending from the float with an inner rotatable drive shaft movably mounted within the outer shaft. At the lower most portion of the shaft opposite the float is a turbine affixed to the inner drive shaft opposite the float. A plurality of reversible vanes are movably mounted on the turbine for transmitting rotational energy to the inner drive shaft responsive to either upward or downward motion of the shaft responsive to wave action on the float. An electric generator or alternator is mounted on the float and cooperates with the inner rotatable shaft to produce an electric current responsive to the rotation of the inner shaft.

5 Claims, 21 Drawing Figures

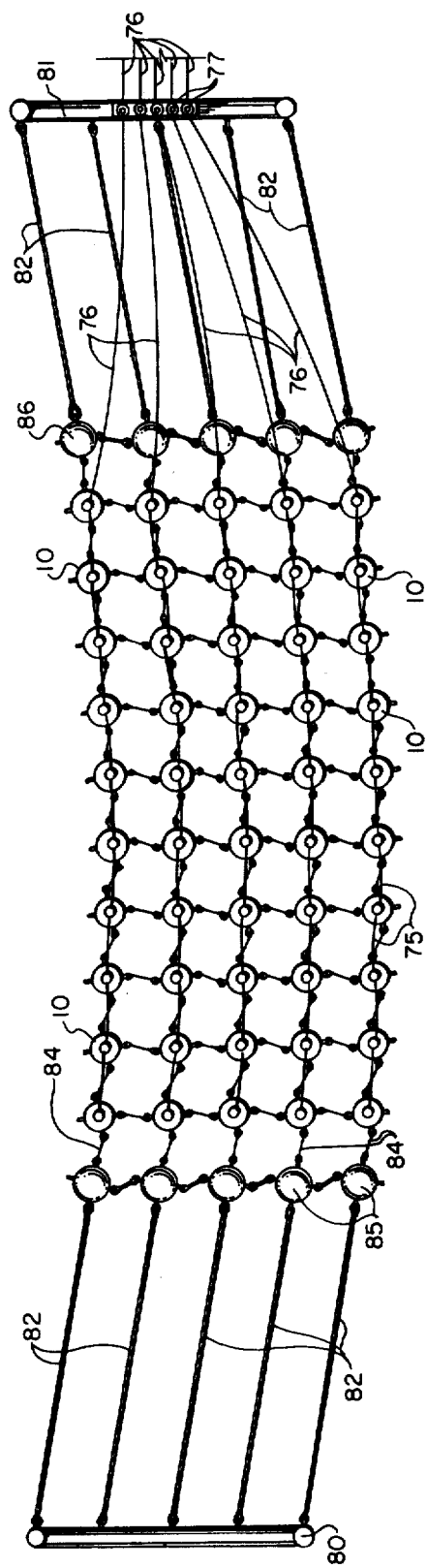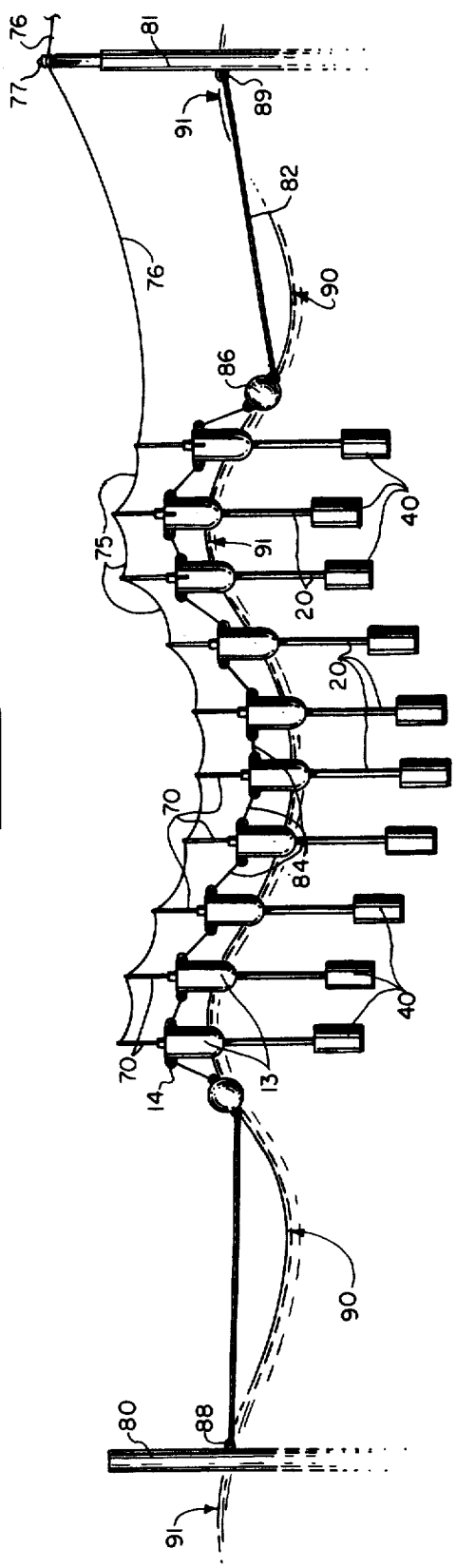

WAVE RESPONSIVE GENERATOR

This is a continuation, of application Ser. No. 092,379, filed Nov. 8, 1979, now abandoned, entitled "Wave Responsive Generator".

BACKGROUND OF THE INVENTION

1. Field of the Invention

The present invention relates to the production of electric energy by harnassing wave action.

Even more particularly, the present invention relates to a wave responsive electric energy generator which continually produces energy responsive to upward and downward movement of waves.

2. General Background and Prior Art

The problem of harnessing the power of waves has long been a problem which has captured the interests of the technical community. It has long been known in the art of power generation to generally harness the energy available in ocean waves to produce for example electrical energy which is usable by the consuming public. Broadly, most of these devices operate initially on the principle of lifting and lowering a float. A great number of devices have been developed and patented along these lines in an attempt to capture the energy of waves, and thus harness their power. See for example, U.S. Pat. Nos., 562,317, 632,139, 694,242, 738,996, 886,883, 917,411, and 986,629. Early patents such as these rely upon mechanical linkages between fixed floats to trap the rocking, lifting, falling, or longitudinal motions of waves. For the most part, these early patents are highly inefficient.

Later patents were developed at the turn of the century attempting to solve the problem of harnessing wave energy. Some references such as U.S. Pat. No. 1,072,272 attempt to harness wave energy by the use of the wave's kinetic energy.

Other prior art type devices include for example U.S. Pat. Nos. 1,184,362, 1,259,845, 1,502,511, 1,202,742, 1,471,222, 1,647,025, 1,746,613, 1,953,285, and 1,962,047.

A plurality or series of floats are seen in for example U.S. Pat. Nos. 14,098,094, 1,567,470, 1,688,032, 1,867,780, and 1,925,742.

U.S. Pat. Nos. 1,528,165, 169,356 and 1,818,066 show early wave motors which are extremely complex mechanically.

More recent wave motors have been patented. See for example U.S. Pat. No. 3,879,950 issued Apr. 29, 1975 to K. Yamada for a wave generator used in conjunction with an offshore nuclear power plant.

In U.S. Pat. No. 3,912,938 issued Oct. 14, 1975 to Gregory D. Philipenco there is provided a floating wave generator that upon piston actuation a turbine system is activated to generate electricity.

In U.S. Pat. No. 3,988,592 issued to William Porter and entitled "Electrical Generator System" there is seen a recently issued U.S. Patent, a combination wind turbine, and wave generating system.

A plurality of screws opened to the sea water generate electricity from the action of ground swells.

In U.S. Pat. No. 4,076,463 issued to M. Welczer there is provided a "Wave Motor". In that patent a cylinder is fixed to a first float with a plunger fixed to a second float and an anchor secured to the cylinder to retain the cylinder in a vertical position above the sea bottom. Wave crests and wave troughs cause the cylinder to move laterally and the plunger to rise and fall within the cylinder thereby converting the wave energy to mechanical pumping energy.

In U.S. Pat. No. 3,930,168 issued to Michael G. Tornabene there is seen a "Wave Action Power Apparatus". The Tornabene device provides a double action piston water pump. To and fro strokes are produced responsive to the float moving upwardly and downwardly on wave crests and troughs.

In U.S. Pat. No. 3,394,658 issued to C. M. Johnson and entitled "Wave Pump" there is provided a cammed rod connected to a float which moves upwardly and downwardly responsive to wave action. A pumping action is produced when a follower tracks the cammed surfaces of the rod to operate a pump.

In U.S. Pat. No. 4,077,213 issued to Glen E. Hagen and entited "Wave Driven Generator" there is provided a plurality of differing sized floats which are connected to form an array through linear interfaces so that relative motions drive hydraulic pumps.

Most of these prior art devices are highly complexed and inefficient.

They rely to the large extent on complex linkages and moving parts which would not withstand a harsh ocean or marine environment.

GENERAL DISCUSSION OF THE PRESENT INVENTION

The present invention provides a simple and inexpensive wave responsive electric energy generator.

The preferred device provides a buoyant float having an outer fixed shaft depending downwardly from the float and adapted to hang from the float as the float rests on the ocean surface.

An inner rotatable drive shaft is rotatably mounted within the outer shaft and provides as its lower end portion a turbine.

A plurality of reversable vanes are movably mounted on the propeller for transmitting rotational energy to the inner drive shaft responsive to the upward and downward motion of the shaft responsive to wave action on the float. An electrical generator or alternator is attached to the upward portion of the rotatable drive shaft for producing an electric current responsive to a rotation of the shaft as caused by the turbine.

Because the vanes are reversable, rotational energy is transmitted to the main drive shaft during both upward and downward movement of the float.

A fly wheel or gear reduction unit could be utilized to enhance wave energy generation by producing a relatively constant rpm at a desired rotational speed.

Thus, it is an object of the present invention to provide a wave responsive electric energy generator which is simple in construction and in operation.

It is another object of the present invention to provide a wave responsive electric energy generator which produces rotational force during both upward and downward movement of the apparatus.

BRIEF DESCRIPTION OF THE DRAWINGS

For a further understanding of the nature and objects of the present invention, reference should be had to the following detailed description, taking in conjunction with the accompanying drawings, in which like parts are given like reference numerals and wherein:

FIGS. 8 and 9 are top and front views respectively of an array of wave generators of the present invention connected together;

DETAILED DESCRIPTION OF THE PREFERRED EMBODIMENT

Figure 1:
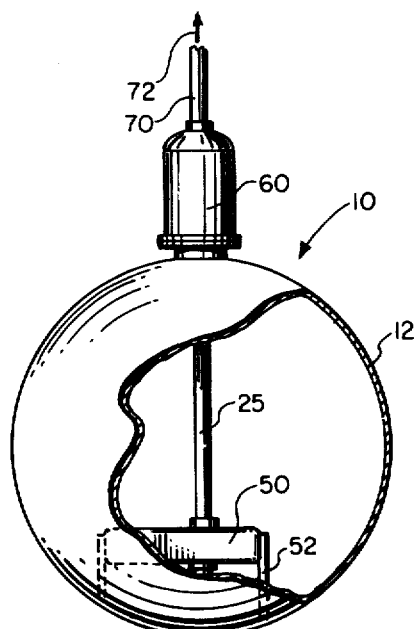
FIG. 1 is a front partially cut away view of the preferred embodiment of the apparatus of the present invention.

FIGS. 1–9 illustrate the preferred embodiment of the apparatus of the present invention designated generally by the numberal 10.

Wave powered electrical generator 10 provides a buoyant float 12 for riding waves in a bobbing fashion. Attached to float 12 is outer shaft 20 depending downwardly from float 12. Inner rotatable drive shaft 25 is rotatably mounted within outer shaft 20 and transmit rotational energy to alternator or generator 60 responsive to wave action on turbine 30, as will be described more fully hereinafter. The density of the apparatus as a unit is heavy enough so that the float and remainder of the apparatus will track the movement of the wave as it rises and falls.

Alternator 60 could be attached to the upper portion of float 12 as seen in FIG. 1 having a power line 70 for conveying electrical energy toward a desired remote point of collection as indicated by arrow 72 in FIG. 1.

If desired, a suitable transfer gear 50 attached by brackets 52 to the inner portion of float 12 could be provided for changing the rotational speed of inner shaft 25 as desired to produce a desired rpm in alternator 60.

Figure 3:
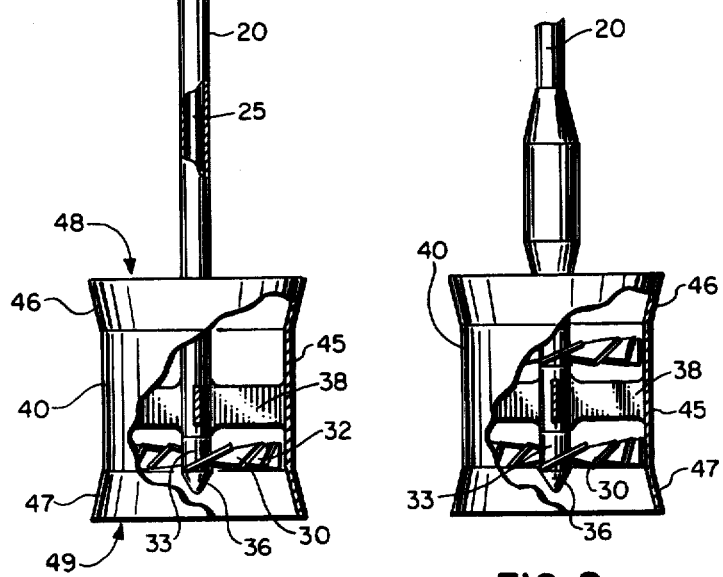
FIG. 3 is a front partially cut away fragmentary view of an alternative construction of the float, fly wheel, and electric generator portions of the preferred embodiment of the apparatus of the present invention.

In an alternative construction as shown in FIG. 3, alternator 60 is mounted within float 12 being attached by means of bracket 62 and so supported.

Also provided in FIG. 3 is fly wheel 64 attached to inner shaft 25.

Suitable transfer gears 50 could be provided as attached to brackets 52 as shown in FIG. 3. A plurality of anchoring eyelets 14 provide an attachment for ropes, lines, or other harnesses for connecting a plurality of wave powered electrical generators 10 together in an array as shown in FIGS. 8 and 9 and for anchoring to a desired stationary object to prevent drifting spinning or the like.

Figure 2:
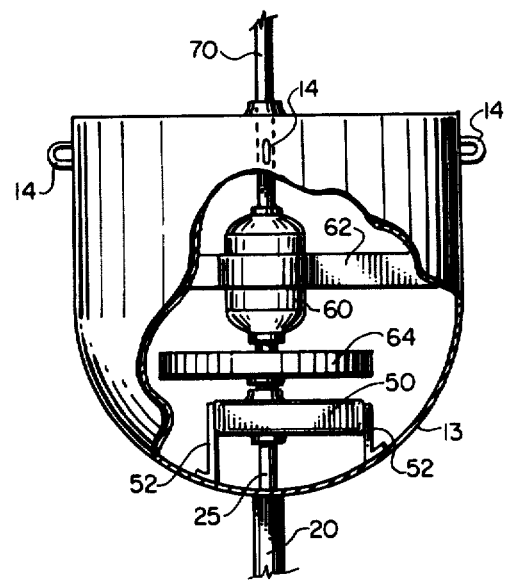
FIG. 2 is a fragmentary view of an alternate construction of the wave generator shown in FIG. 1.

FIGS. 1 and 2 illustrate more particularly the construction of turbine 30 and shroud 40. Turbine 30 provides a plurality of vanes 32 which are mounted to hub 33. Hub 33 rotates with inner shaft 25. Vanes 32 are reversable type as seen in FIGS. 4–7 as will be discussed more fully hereinafter.

Shroud 40 is attached to outer shaft 20 by means of a plurality of ribs 38. Shroud 40 provides a center cylindrical section 45 and frusto-conical end portions 46, 47. This provides a venturi effect increasing the speed of fluids at turbine 30 as is desirable. Shroud 40 also offers protection to turbine 30 from foreign objects.

Note that openings 48, 49 are provided at each end portion of shroud 40 allowing fluid flow through shroud 40 between openings 48 and 49.

FIG. 2 illustrates an alternative construction in which alternator or generator 60 could be located adjacent turbine 30. Additionally, a pair of turbines 30 is shown in FIG. 2 attached respectively to opposite sides of ribs 38 and attached to drive shaft 25 for rotation therewith. In the embodiment of FIG. 2 outer shaft 20 would house electrical cables (not shown) for transmitting electrical power upwardly toward a desired point of collection.

Figure 4:
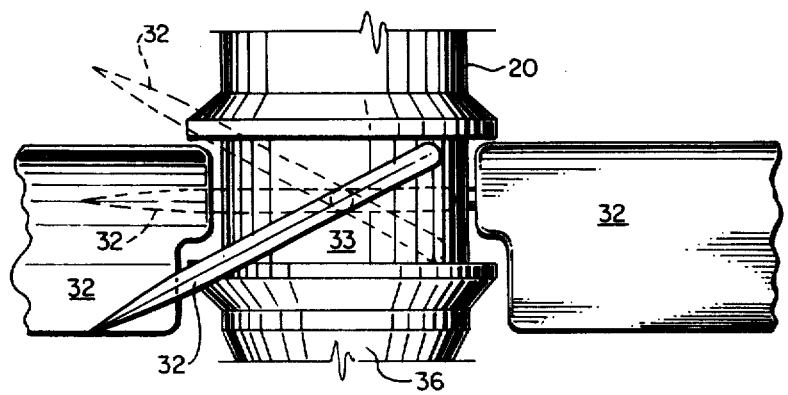
FIG. 4 is a partial detailed frangmentary view of the movable vane portions of the preferred embodiment of the apparatus of the present invention.
Figure 4A:
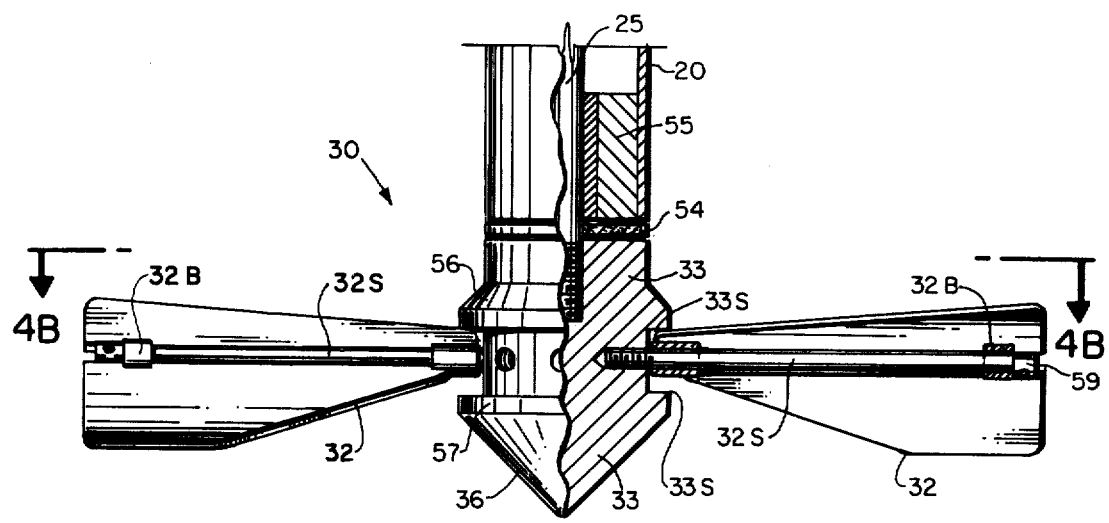
FIGS. 4A–4B are front partial cutaway and top views respectively of the turbine portion of the preferred embodiment of the present invention.
Figure 4B:
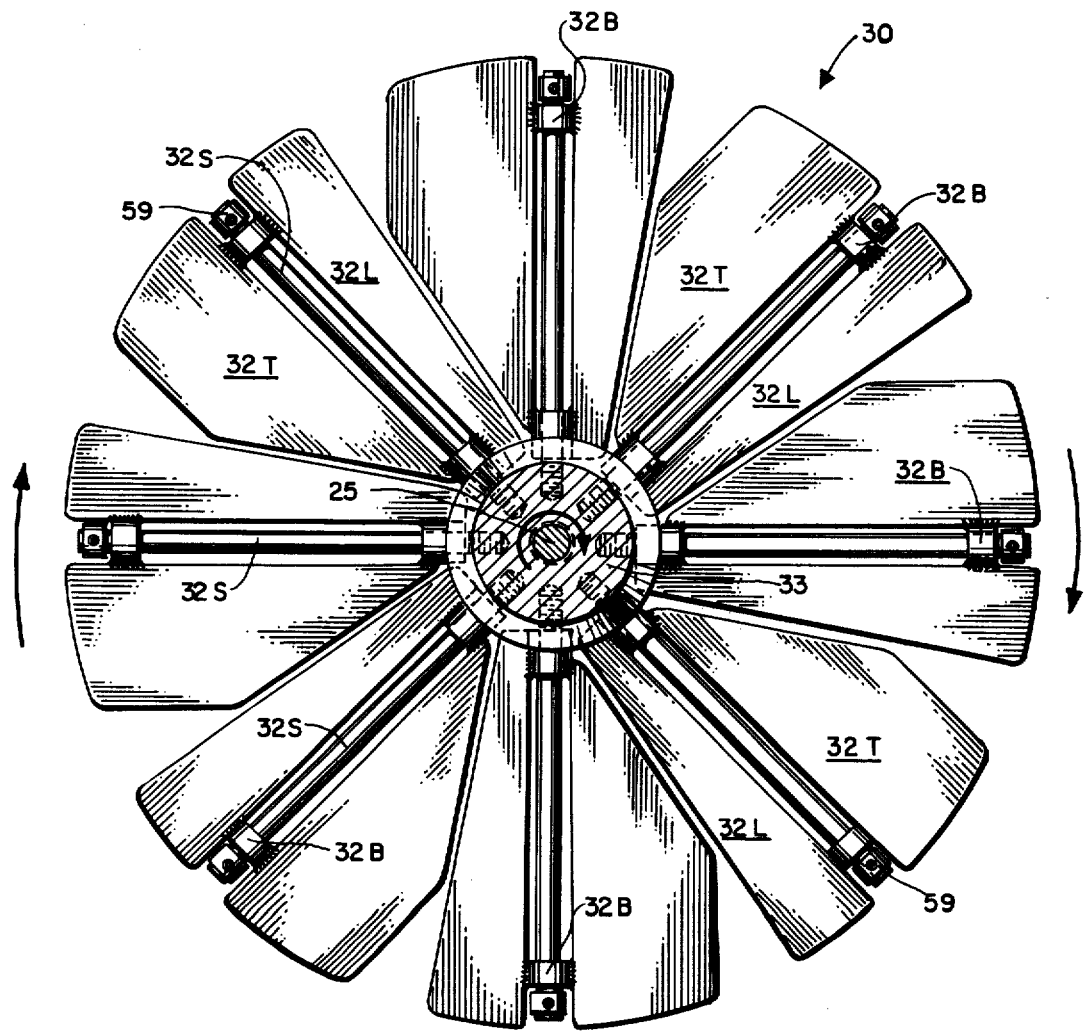

FIGS. 4–7 as aforementioned, illustrate the variable reversable blade pitch of turbine vanes 32. FIG. 4 illustrated in phantom lines vanes 32 as they move between various pitched positions. A neutral position of vanes 32 is illustrated in phantom lines also in FIG. 4. The reversability of vanes 32 is accomplished as changes wave generator 10 direction of travel upwardly or downwardly in accordance with wave action. Vanes 32 are mounted upon shafts 32S to the hub 33 capped with nose guard (see FIGS. 4A–4B) in such a manner as to be rotatably mounted on vane shafts 32S enabling vane pitch to change. Each shaft can have a threaded end portion with a corresponding female threaded portion provided to hub 33 for each shaft 33S. Each vane 32 comprises a larger trailing area 32T and a smaller leading area 32L connected by vane busings 32B which are movable upon shafts 32S. Retainers 59 provided at the end of each vane shaft 32S prevent removal of vanes 32. The trailing area 32T of vane 32 is greater than the leading area 32L forward of vane shaft 32S. From the above, it will be appreciated that any change in force against vanes 32 by the surrounding water causes a pitch change as desired. The angle of the blade in both extreme directions is governed by vane stop 33S which in the preferred embodiment is formed by upper 56 and lower 57 annular projecting shoulders. Since shoulders 56, 57 are continuous, all vanes angles are equally controlled between extreme positions. Water lubricated bearing 55 can be provided between drive shaft 25 and outer shaft 20 at hub 33. Floating thrust washer 54 attaches about drive shaft 25 between hub 33 and outer shaft 20.

Figure 5:
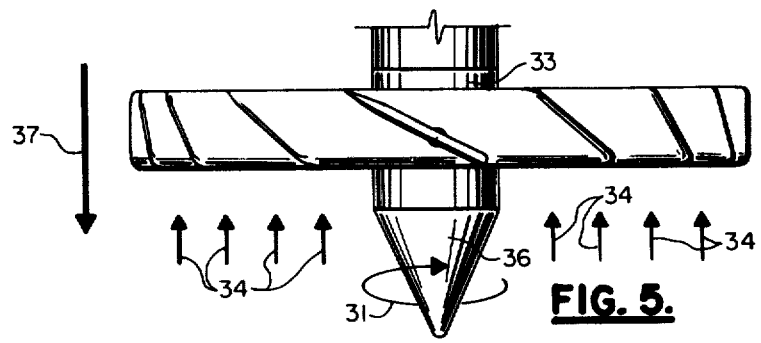
FIGS. 5, 6 and 7 are sequential views illustrating the movable vein portion of the preferred embodiment of the apparatus of the present invention during upward and downward movement of the entire apparatus.
Figure 6:
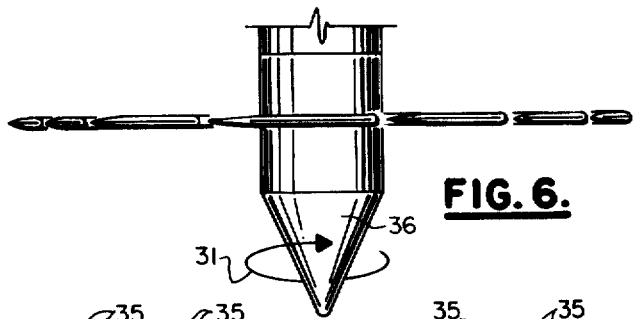
Figure 7:
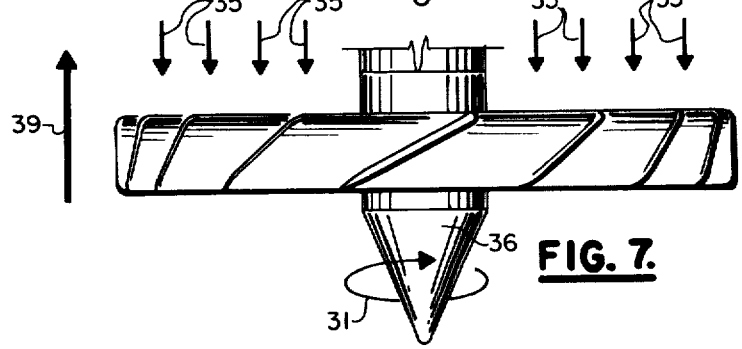

FIGS. 5–7 show the reversable pitch of vanes 32 during downward movement (see arrow 37 of FIG. 5) of turbine 30, and at a transitional position (see FIG. 6) as well as during upward movement (see FIG. 7, arrow 39) of turbine 30.

In FIG. 5 arrow 37 illustrates a downward movement of turbine 30. Fluid flow upwardly is represented by arrows 34 which will be the force of fluid acting upon vanes 32 to produce a rotation as illustrated by the curved arrow 31 in FIG. 5. At a transitional position as shown in FIG. 6, vanes 32 are generally horizontal. In FIG. 7 a complete change of vanes position as seen as upward movement (see arrow 39) is moving turbine 30 upwardly. In this position, arrows 35 indicate the downward movement of fluid against turbine 30 as turbine 30 moves upwardly.

It will be appreciated, that the upward and downward movement respectively of turbine 30 will be generated as float 12 moves upwardly and downwardly on crests and troughs of waves.

It will also be appreciated from the above that continuous rotational energy will be produced notwithstanding the fact that float 12 moves upwardly and downwardly reversing the overall direction of turbine 30. The reversable vanes as taught above will produce a generally continuous rotational force being transmitted through drive shaft 25 to alternator or generator 60.

In FIGS. 8 and 9 there can be seen a plurality of generating units 10 connected together in an array.

In FIGS. 8 and 9 anchors 80, 81 are embedded in the seabed for example having anchoring eyelets 88, 89 respectively for the attachment of mooring lines 82. A plurality of mooring lines 82 attach to for example end floats 85, 86 to which are affixed by means of lines 84 a plurality of wave responsive generating units 10. Eyelets 14 provided on each float 12 form points for the attachment of connecting lines 84. Wave crests 91 and wave troughts 90 are illustrated in FIG. 9 which show the upward and downward movement respectively of generating units 10. Also seen in FIG. 9 are the outer shafts 20 and shroud 40 portion of each unit 10.

A plurality of upper power lines 70 connect with collection lines 75 for transmitting electrical power to main energy buss 76 inwardly toward a desired point of collection. Insulators 77 as required can be attached to anchor 81 as insulation.

Figure 10:
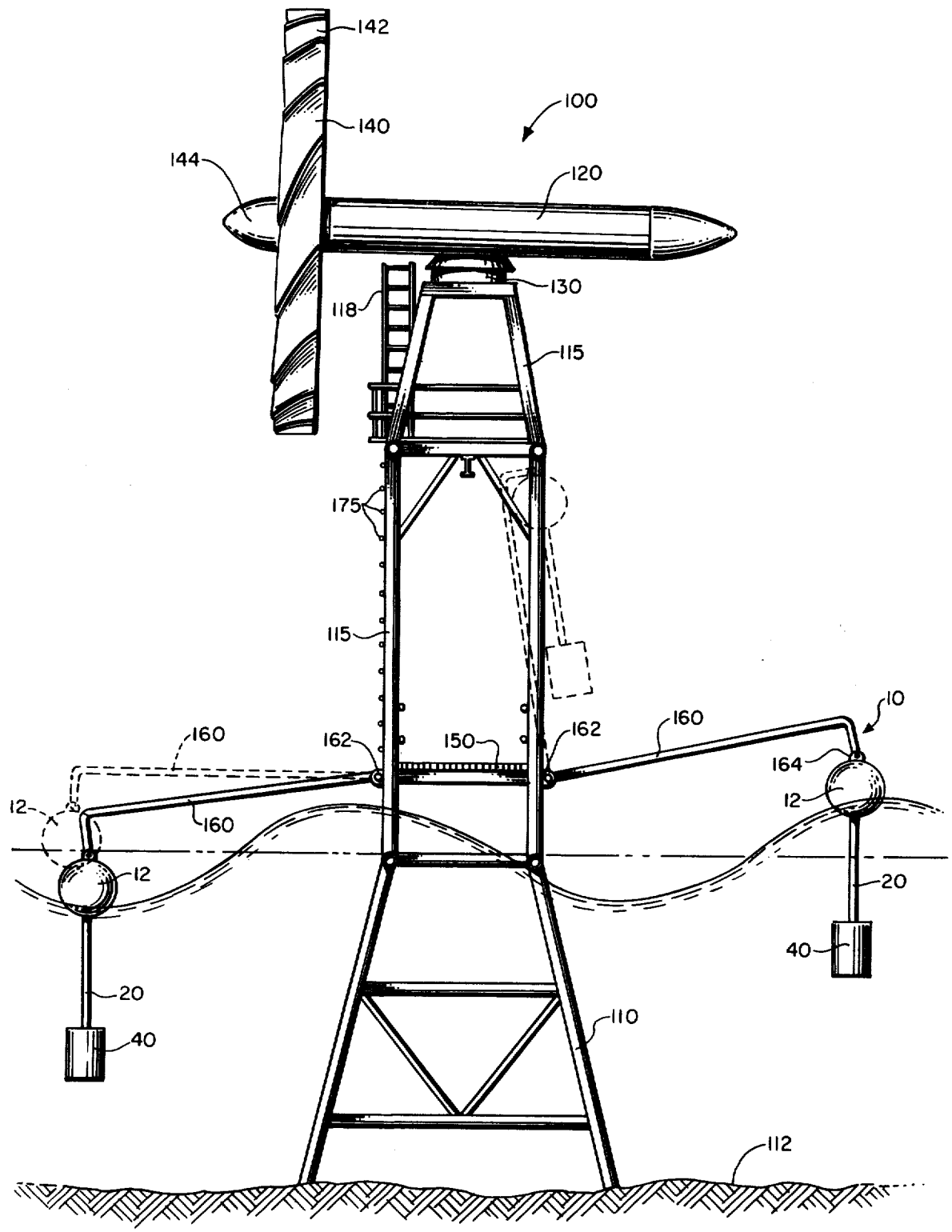
FIG. 10 is a side elevational view of an alternative embodiment of the apparatus of the present invention.
Figure 11:
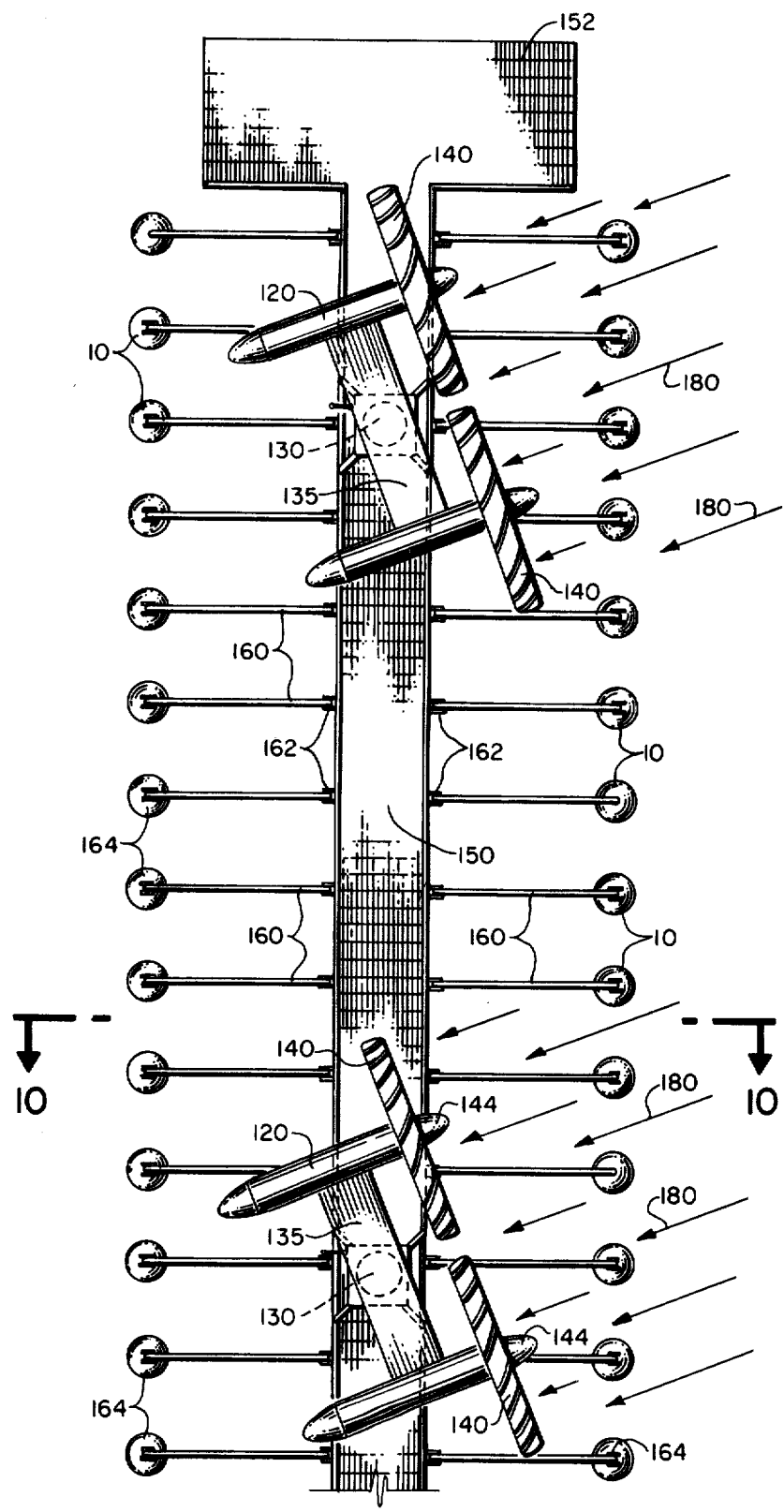
FIG. 11 is a top view of the wave generator of FIG. 10.

FIGS. 10 and 11 show an alternative embodiment of the apparatus of the present invention designated generally by the numeral 100.

In FIG. 10 there is provided a platform 110 which can be anchored in the seabed 112 as is known in the art.

Platform 110 provides a super structure 115 having an upward windmill body 120 with a turbine 140 attached thereto in a rotatable fashion. A plurality of vanes 142 are provided to turbine 140 having noseguard 144 for streamlining purposes. Super structure 115 provides upper pivot 130 for pivotally attaching mill body 120 to super structure 115.

In FIG. 11 there can be seen more clearly the construction of pivot 130 and mill 120 and cross bracket 135. The fluid flow is represented by arrows 180.

In FIG. 11 two windmill 120 members are attached to bracket 135 which is pivotally attached at pivot 130 to super structure 115. Also provided is a catwalk 150 structure having a boat dock 152 at one end portion allowing access to the entire apparatus.

A plurality of inner pivots 162 attached a pivot arm 160 to super structure 115 with the opposite end portions of arms 160 also providing floats pivots 164. Attached at float pivots 164 are wave generating units 10 as shown in FIG. 1 for example having float 12 shaft 20, and shroud 40.

A plurality of electrical supply lines 175 are seen in FIG. 10 for transmitting electricity generated to a desired point of collection.

Access ladder 118 can be seen in FIG. 10 attached to the upper portion of super structure 115.

FIGS. 12–15 show a second alternate embodiment of the present invention, designated generally by the numeral 200.

Figure 12:
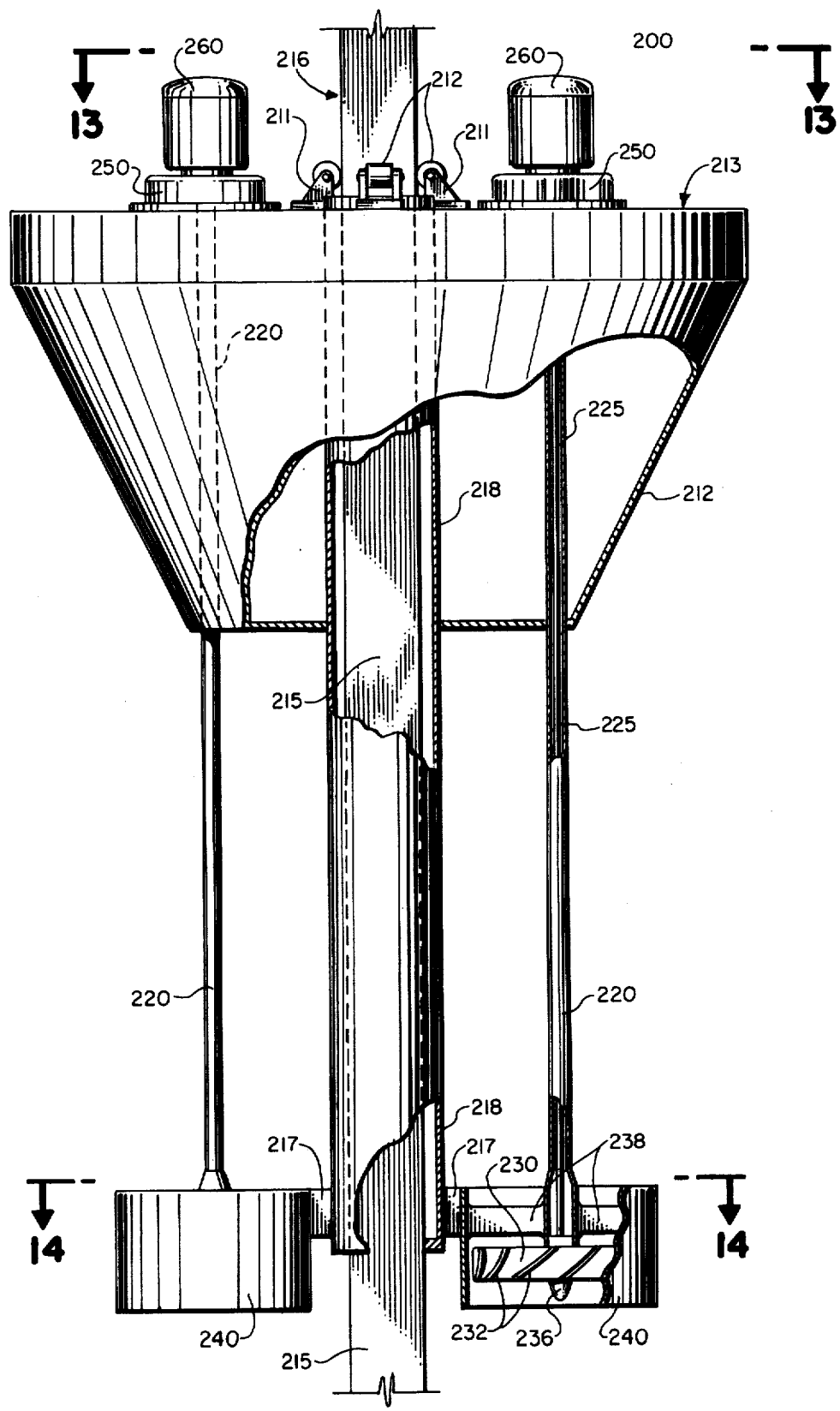
FIG. 12 is a front elevational partially cut away view of a second alternative embodiment of the apparatus of the present invention.

Wave responsive generator 200 is composed of buoyant float 212 for riding waves in a bobbing fashion. In FIG. 12, an anchor pile 215 (which can be driven into the sea bed 112) forms a guide upon which wave responsive generator 200 travels upwardly and downwardly (see FIG. 15). Attached to float 212 is a plurality of outer shafts 220, each housing an inner drive shaft 225. Guide rollers 214 and roller brackets 211 brace float 212 against pile 215.

Pile sleeve 218 attaches to float 212 and surrounds pile 215. Ribs 217 (FIG. 14) attach pile sleeve 218 to a plurality of shrouds 240, attached to outer shafts 220 by means of a plurality of ribs 238, each shroud housing at least one turbine 230 with vanes 232. Shaft 220 at its lower extremity is capped with nose guard 236.

Figure 13:
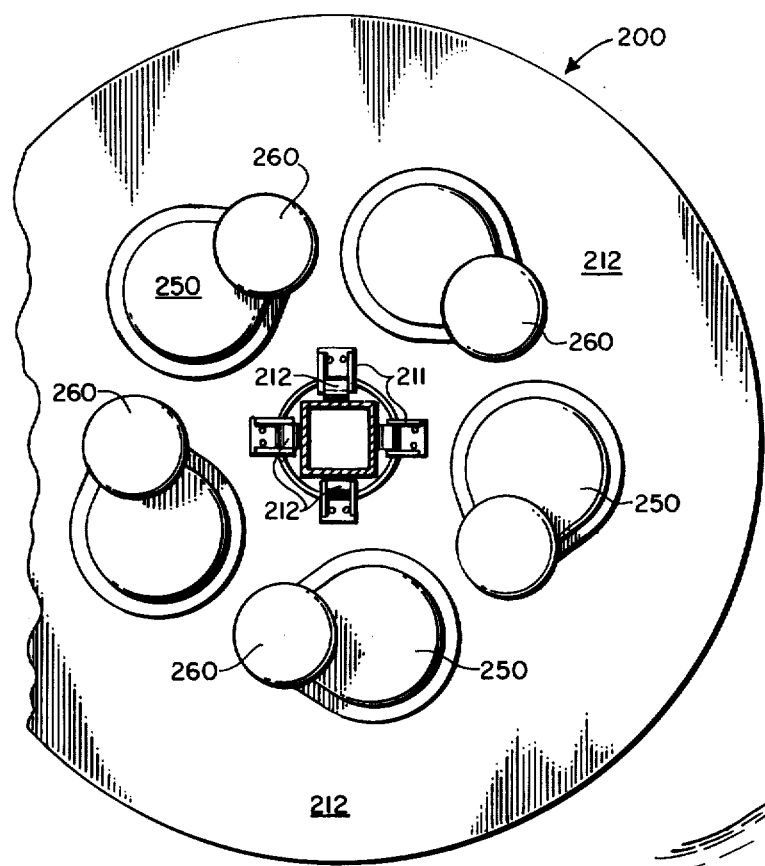
FIG. 13 is a top view of the wave generator shown in FIG. 12.

In FIG. 13, a plurality of transfer gears 250 are provided associated with each alternator (or generator) 260 mounted upon upper surface 213 of float 212.

Figure 15:
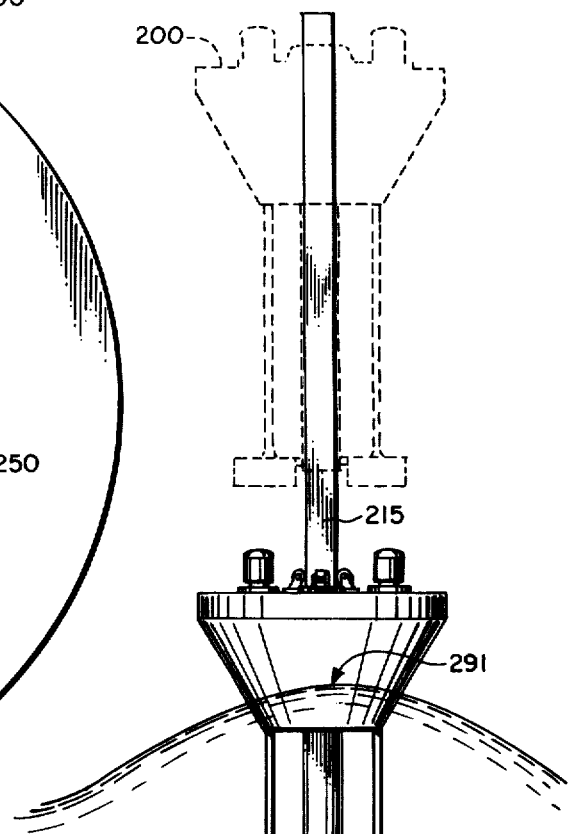
FIG. 15 is a schematic view of the wave generator of FIGS. 12–14 shown during operation.
Figure 14:
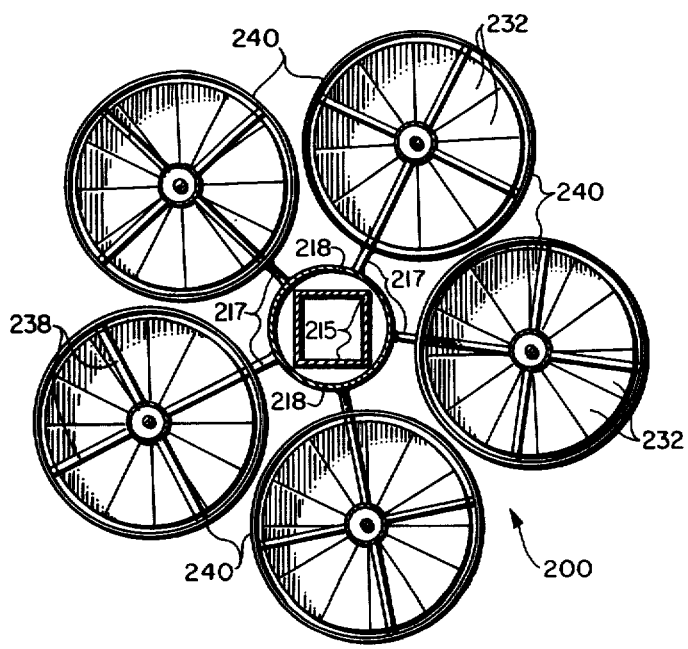
FIG. 14 is a sectional view taken along lines 14—14 of FIG. 12.

From the above it can be seen that five turbines 230 are attached in a "cluster" arrangement to a single float. Operation of each drive shaft 220, shroud 240, turbine 230 will otherwise be the same as with respect to the embodiment of FIGS. 1–7. FIG. 15 shows a schematic view of wave responsive generator 200 in use riding upon wave crest 291 and wave trough 290, differing positions shown in phantom lines.

Figure 16:
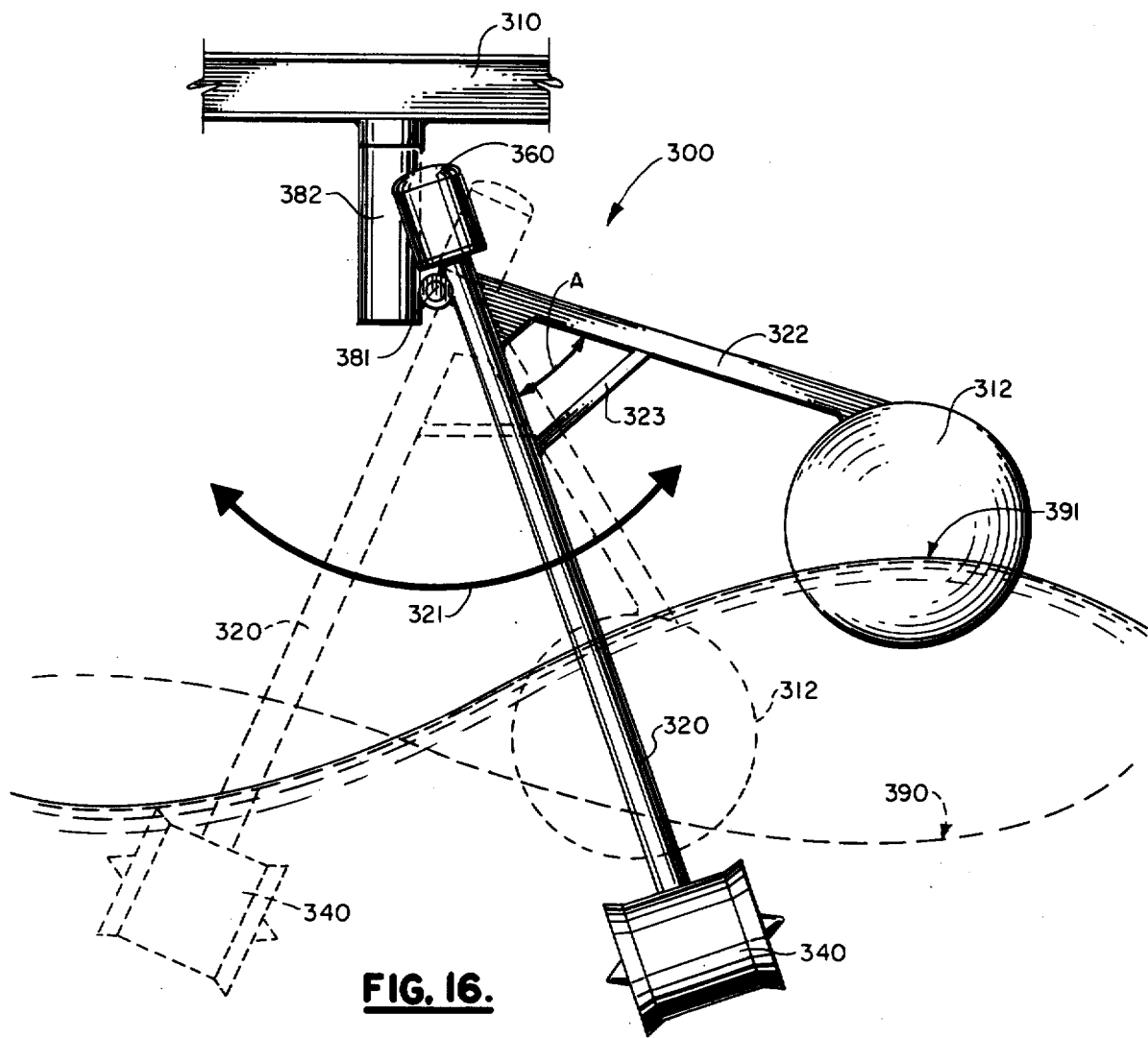
FIG. 16 is a partial side view of a third alternative embodiment of the apparatus of the present invention.

FIGS. 16–19 provide a third alternative embodiment of the apparatus of the present invention designated generally in FIG. 16 by the numeral 300.

Wave responsive generator 300 provides a construction which moves turbine 330 through a generally horizontal arcuate path responsive to vertical travel of buoy 312. Crests 391 and trough 390 of waves are seen in FIG. 16.

Figure 17:
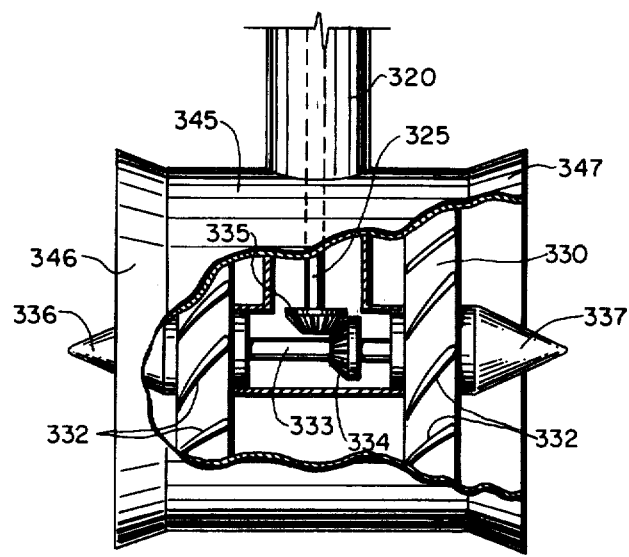
FIG. 17 is a partial side cut away view of the turbine portion of the embodiment shown in FIG. 16.

The operation of turbine 330 having vanes 332 and mounted within shroud 340 is similar as with respect to the earlier discussed embodiment. A right angle gear transfer is seen in FIG. 17 comprising bevel gear 345 attached to vertical drive shaft 325 and bevel gear 334 mounted on horizontal drive shaft 333 with shaft 333, gear 334 and turbines 330 being rototably mounted upon the lower end portion of outer shaft 320. Nose guards 336, 337 provide streamlining. Shroud 340 comprises cylindrical section 345 and frusto-conical end portions 346, 347 as similarly constructed with respect to the embodiment of FIGS. 1–2.

Figure 18:
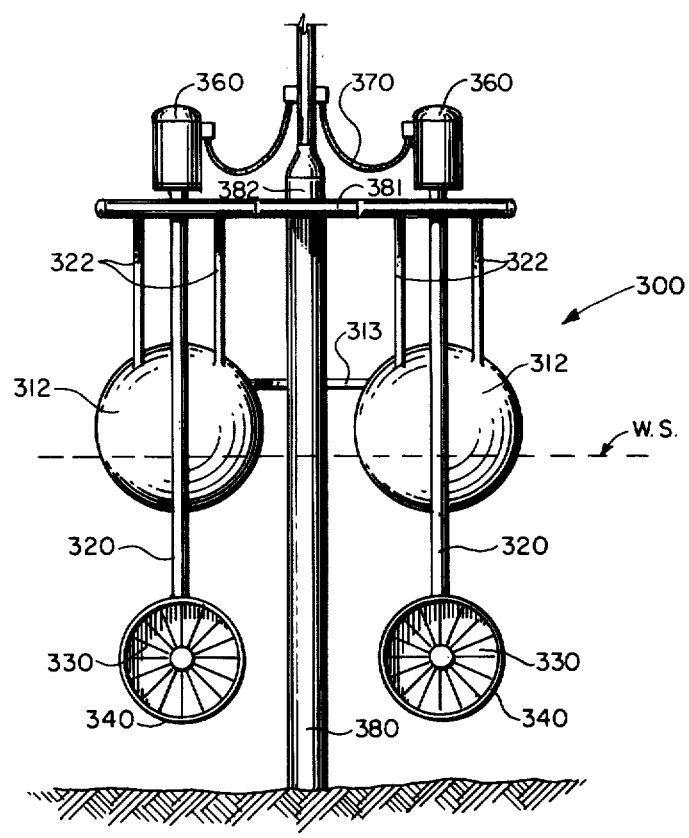
FIG. 18 is a front elevational view of the wave generator of FIG. 16.

Wave responsive generator 300 having alternators (or generators) 360 can be attached to anchored pile 380 embedded to seabed 112 as seen in FIG. 18, or to any suitable existing structure (as for example an existing oil platform or the like) 310 as seen in FIG. 16. Alternators 360 can be electrically supplied power by lines 370.

Bushings 381, 382 allow rotation about both horizontal and vertical axes. Curved arrow 321 in FIG. 16 illustrates rotation of float 312 and shroud 340 about a horizontal axis with bushing 381 rotating upon horizontal shaft 383. Attached to bushing 381 is float arm 322 and turbine outer shaft 320 which can be connected by cross brace 323 to form for example an A-frame structural unit. Other suitable structural bracing could be used to connect float arm 322 and outershaft 320 if desired or if required by weather and/or wave conditions or the like.

Figure 19:
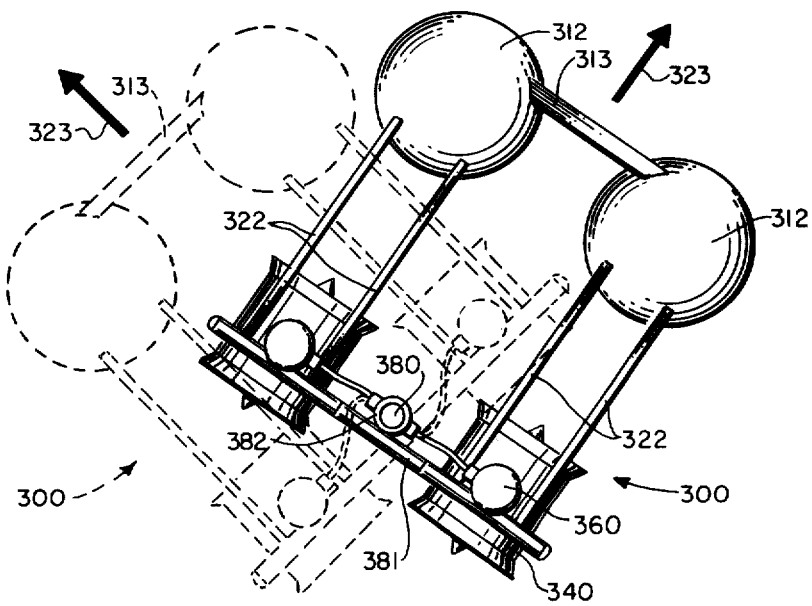
FIG. 19 is a top view of the wave generator shown in FIGS. 16–18.

FIGS. 18-19 provide front and top views respectively of wave responsive generator 300. In FIG. 18, two turbines 330 and floats 312 rigidly connected by brace 313 are seen with floats 312 assuming a bobbing position upon water surface "W.S." and moving upwardly and downwardly as desired responsive to wave action. FIG. 19 shows a top view of wave responsive generator 300 illustrating rotation about a vertical axis, bushing 382 rotating upon vertical anchor pile 380 at the upper portion thereof. Arrows 399 in FIG. 19 illustrate different positions of wave responsive generator 300 to which it will move depending upon tidal flow direction, wind direction and like randomly changing forces dependent upon tidal, wave and weather conditions.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A free floating wave responsive generator comprising:
   a. a buoyant float which freely bobs up and down responsive to the adjacent wave action during operation;
   b. an outer fixed shaft depending downwardly from said float;
   c. an inner drive shaft depending downwardly from and being rotatably mounted within said outer shaft to said float;
   d. a turbine affixed to said drive shaft opposite said float;
   e. a plurality of variable pitch vanes movably mounted on said turbine, said vanes transmitting rotational energy to said drive shaft responsive to upward and downward wave action on said float each of said vanes comprising a leading edge and a trailing edge, the area of the trailing edge being greater than the area of the leading edge, with fluid pressure acting generally vertically upon the vanes producing the variance of vane pitch responsive to the change of vertical direction of the float so that the drive shaft is rotated during both upward and downward movement of the float;
   f. electric generator means cooperatively connected to said inner drive shaft for producing an electrical current responsive to the rotation of said drive shaft; and
   g. a rotatable hub affixed to said drive shaft rotating freely with respect to the outer shaft at the lowermost portion thereof with said plurality of vanes attached to said hub, each of said vanes being movable between variable pitch positions responsive to fluid pressure thereon, the hub defining the travel limit of the vanes in each direction and a plurality of vane shafts radiating from the hub, each shaft supporting one of the vanes.

2. The apparatus of claim 1 further comprising shroud means surrounding at least in part said turbine.

3. The apparatus of claim 2 wherein said shroud provides a plurality of ribs attaching said shroud to the lowermost portion of said outer fixed shaft.

4. The apparatus of claim 1 further comprising flywheel means attached to said drive shaft for maintaining a rotation of said drive shaft when energy is transmitted thereto.

5. The apparatus of claim 1 further comprising gear means for transmitting rotational energy from said drive shaft to said electric generator means at a rotational speed different than the speed at which said drive shaft rotates.

* * * * *